United States Patent
Poulsen

(10) Patent No.: US 7,771,503 B2
(45) Date of Patent: Aug. 10, 2010

(54) METHOD OF MANUFACTURING A FILTER ELEMENT

(75) Inventor: Jørgen Poulsen, Nakskov (DK)

(73) Assignee: Nordic Air Filtration A/S, Nakskov (DK)

( * ) Notice: Subject to any disclaimer, the term of this patent is extended or adjusted under 35 U.S.C. 154(b) by 184 days.

(21) Appl. No.: 10/597,978

(22) PCT Filed: Mar. 11, 2005

(86) PCT No.: PCT/DK2005/000169

§ 371 (c)(1),
(2), (4) Date: May 16, 2007

(87) PCT Pub. No.: WO2005/087347

PCT Pub. Date: Sep. 22, 2005

(65) Prior Publication Data

US 2008/0016836 A1    Jan. 24, 2008

(30) Foreign Application Priority Data

Mar. 17, 2004  (DK) ............................... 2004 00427
Dec. 10, 2004  (DK) ............................... 2004 01917

(51) Int. Cl.
| | |
|---|---|
| B01D 39/00 | (2006.01) |
| B01D 46/00 | (2006.01) |
| B01D 47/00 | (2006.01) |
| B01D 53/00 | (2006.01) |
| B01D 39/06 | (2006.01) |
| B01D 39/14 | (2006.01) |
| B01D 27/00 | (2006.01) |

(52) U.S. Cl. ............................. 55/490; 55/491; 55/492; 55/493; 55/494; 55/495; 55/496; 55/497; 55/498; 55/522; 55/523; 55/524; 210/437

(58) Field of Classification Search ........... 55/490–498, 55/522–524; 210/437
See application file for complete search history.

(56) References Cited

U.S. PATENT DOCUMENTS 2,537,217 A * 1/1951 Farr ........................... 55/488

(Continued)

FOREIGN PATENT DOCUMENTS

| DE | 197 37 954 A1 | 3/1999 |
|---|---|---|
| DK | 174840 B1 | 12/2003 |
| GB | 2020995 A | 11/1979 |
| WO | WO 03/039710 A1 | 5/2003 |

OTHER PUBLICATIONS

Translation of document DK 174840 B1.*

*Primary Examiner*—Walter D Griffin
*Assistant Examiner*—Amber Orlando
(74) *Attorney, Agent, or Firm*—William J. Sapone; Coleman Sudol Sapone P.C.

(57) ABSTRACT

The invention relates to a method of manufacturing a filter element for use in connection with e.g. gas turbines and comprising a hollow outer insert in which a hollow inner insert is arranged centrally relative to the outer insert, said inserts comprising end edges to which a top flange is secured at one end, said inserts being stiffened by a net (6), said net (6) being made by applying a liquid mass (5) to the outer and/or inner side of the filter element (I) by means of one or more nozzles (4, 6), said nozzles (4,7) being movable relative to the filter element (1), one or more nozzles (4, 7) being stationary in the longitudinal direction of the filter element (1) during the application of molding mass (5) in one or more rings (8), while the filter element (1) rotates a number of rotations about its longitudinal axis, on which one or more nozzles (4, 7) oscillate with an oscillation greater than or equal to the distance between two rings (8) and smaller than or equal to the length of the filter element (1) for the application of connecting lines (9) between the rings (8). The invention also relates to a filter element (1) manufactured by the method, wherein the stiffening (6) of the filter element (1) is formed by a solidified molding mass (5), and the filter element (1) is made of combustible materials.

8 Claims, 3 Drawing Sheets

U.S. PATENT DOCUMENTS

Figure 1:
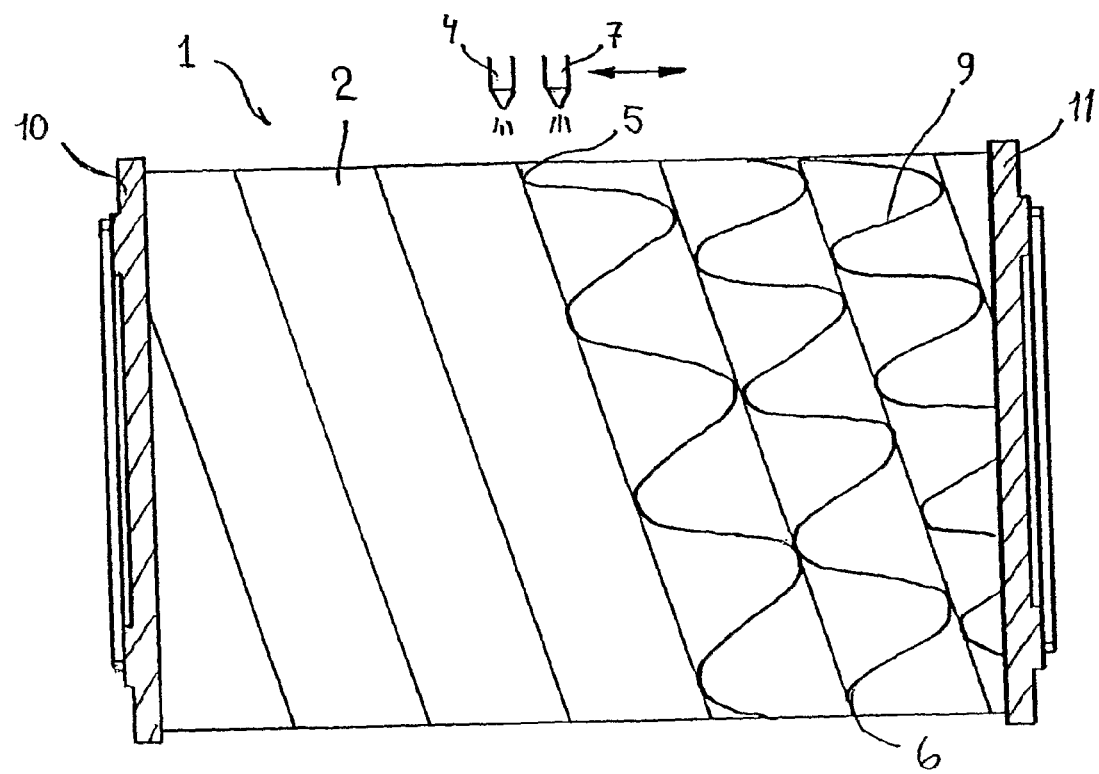

| | | | |
|---|---|---|---|
| 3,183,285 A * | 5/1965 | Boylan | 264/46.4 |
| 3,241,680 A * | 3/1966 | Humbert, Jr. | 210/457 |
| 3,692,184 A * | 9/1972 | Miller et al. | 210/437 |
| 3,853,410 A * | 12/1974 | Busoni | 401/1 |
| 4,402,830 A * | 9/1983 | Pall | 210/457 |
| 4,925,601 A * | 5/1990 | Vogt et al. | 264/6 |
| 5,066,319 A * | 11/1991 | Lippold | 55/521 |
| 5,211,846 A * | 5/1993 | Kott et al. | 210/232 |
| 5,605,748 A * | 2/1997 | Kennedy et al. | 55/486 |
| 5,609,711 A * | 3/1997 | Miller | 156/292 |
| 5,753,071 A * | 5/1998 | Spencer | 156/446 |
| 5,868,889 A * | 2/1999 | Kahler | 156/204 |
| 5,895,510 A * | 4/1999 | Butler et al. | 55/490 |
| 5,904,846 A * | 5/1999 | Clements et al. | 210/321.77 |
| 6,015,499 A * | 1/2000 | Hayden | 210/767 |
| 6,171,354 B1 * | 1/2001 | Johnson | 55/309 |
| 6,233,790 B1 * | 5/2001 | Carothers | 24/16 PB |
| 6,299,662 B1 * | 10/2001 | Poulsen | 55/498 |
| 6,409,785 B1 * | 6/2002 | Smithies et al. | 55/486 |
| 7,287,575 B2 * | 10/2007 | Andersson et al. | 165/72 |
| 7,413,588 B2 * | 8/2008 | Holzmann et al. | 55/502 |
| 2002/0168469 A1 * | 11/2002 | Adams et al. | 427/282 |
| 2006/0005517 A1 * | 1/2006 | Sundet et al. | 55/497 |

* cited by examiner

METHOD OF MANUFACTURING A FILTER ELEMENT

THE PRIOR ART

The present invention relates to a method of manufacturing a filter element for use in connection with e.g. gas turbines and comprising a hollow outer insert in which a hollow inner insert is arranged centrally relative to the outer insert, said inserts comprising end edges to which a top flange is secured, said inserts being stiffened by a net.

The invention also relates to a filter element manufactured by the method.

DK Patent 174840 discloses a filter element in which all the components are made of materials which may be disposed of in an environmentally friendly manner after completed use of the filter. In this known filter element, the filter element is stiffened so that at least one insert is composed of a base material to which a net is attached by means of one or more hot melt lines or points. The base material and the net are made of combustible materials.

However, manufacture of a filter element according to this prior art is cumbersome and expensive.

THE OBJECT OF THE INVENTION

The invention provides a filter element where it is possible to apply a liquid mass to the surface of the filter element, said liquid mass creating a form of stiffening lattice for the filter element when it solidifies.

The advantage of the manufacture of such a filter element, in addition to the fact that all the parts of which the filter element is made are combustible, is that the filter element may be manufactured much more rapidly and inexpensively, as the manufacturing process itself is simplified considerably.

The selected materials thus result in a simplification of the structure of the filter element, as the moulded material constitutes a good stiffening of the filter element.

Owing to the optimum stiffening of the filter elements, the requirements with respect to an attachment system for such a filter element will be minimum, as further stiffening is not necessary. Thus, the filter element per se constitutes a housing for the filter.

This is achieved according to the method in that the net is made by applying a liquid mass to the outer and/or inner side of the filter element by means of one or more nozzles, said nozzles being movable relative to the filter element.

THE DRAWING

Figure 2:
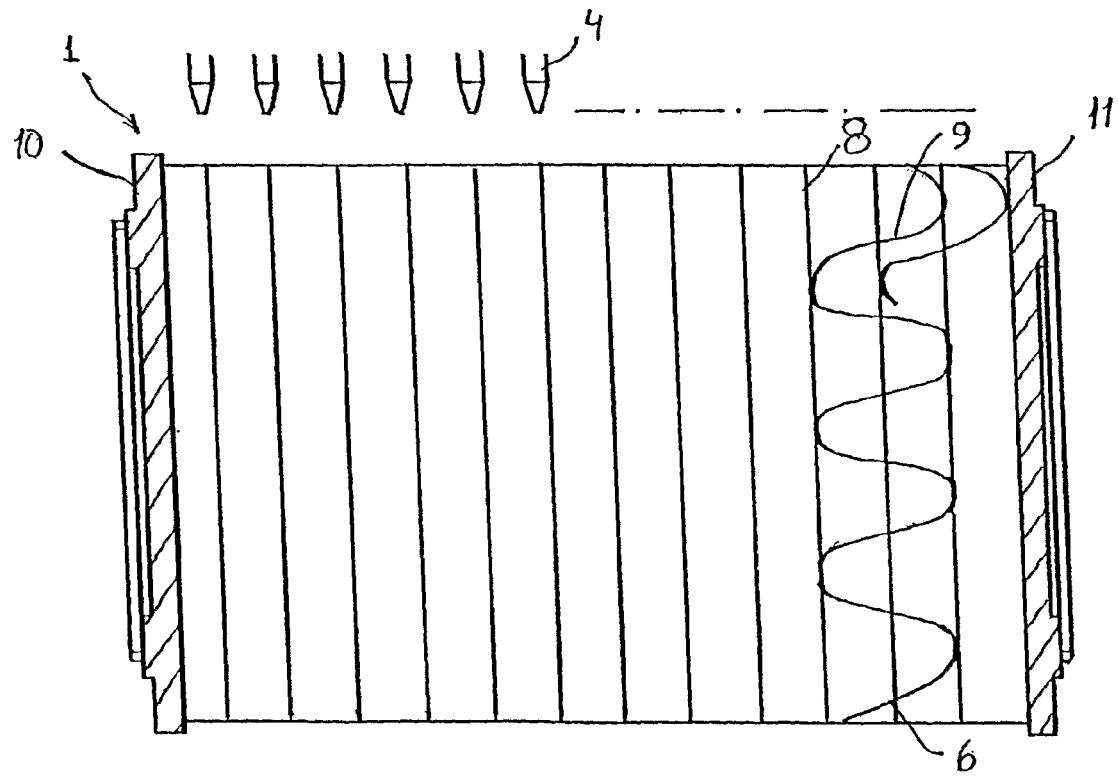
Figure 3:
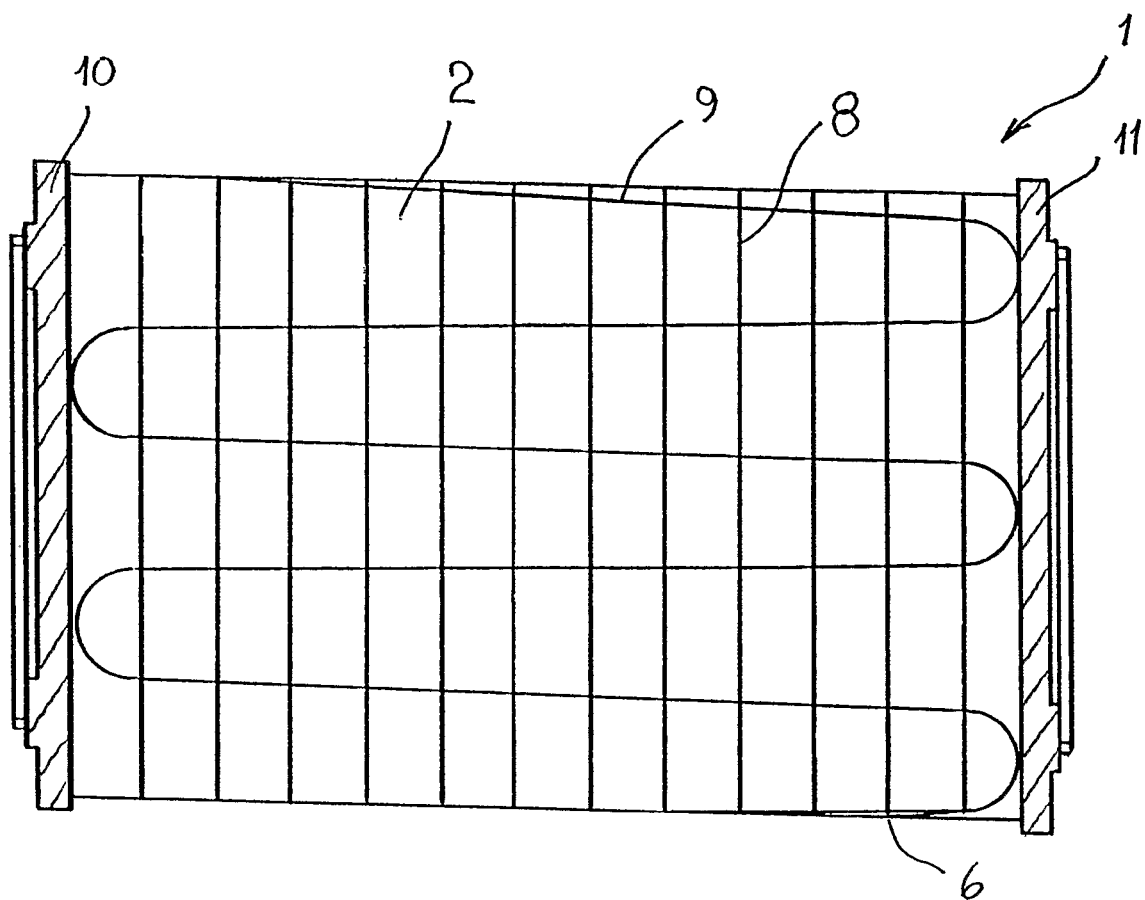
Figure 4:
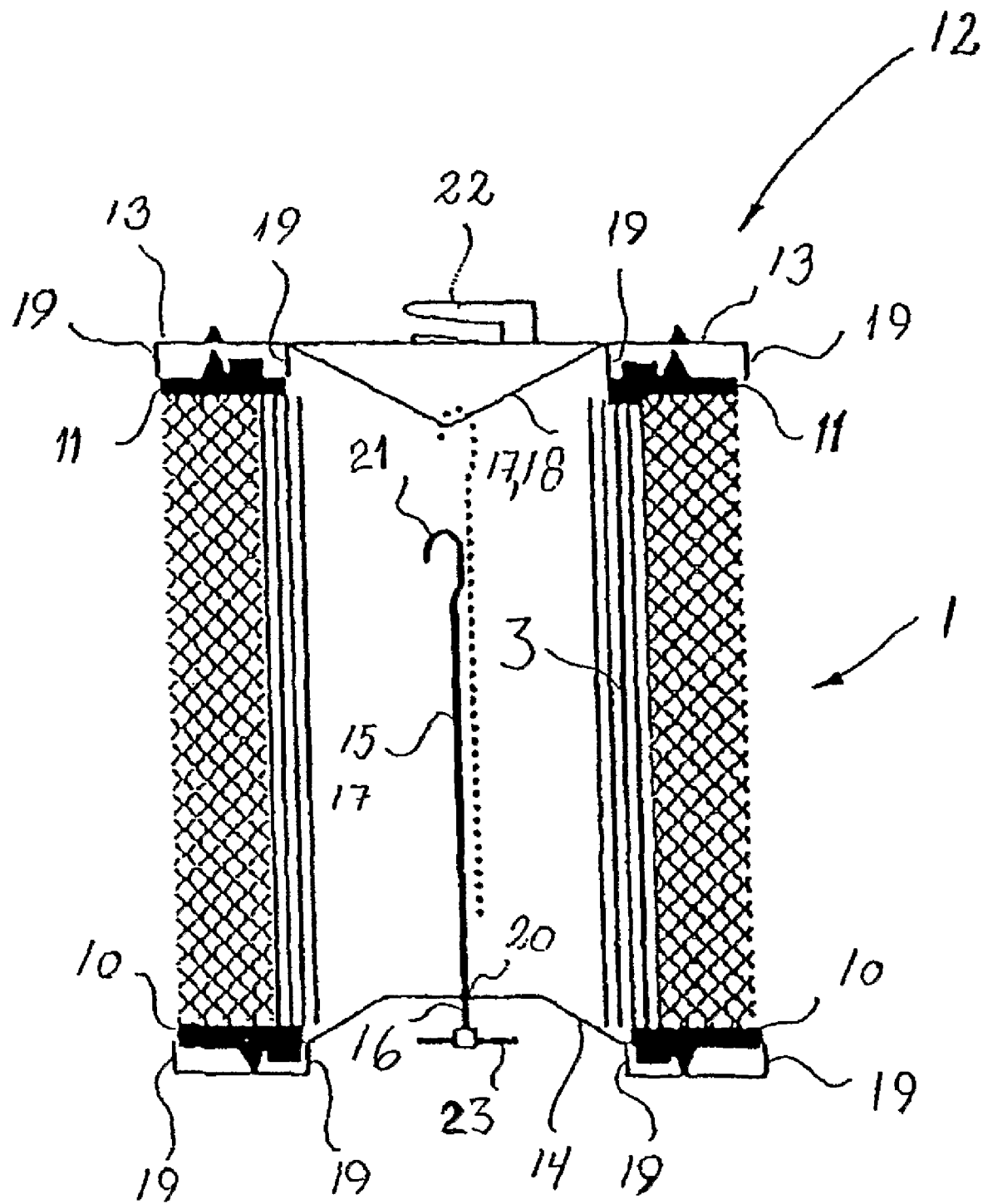

The invention will now be explained more fully with reference to the drawing, in which FIG. 1 shows a filter element with a moulded lattice according to the invention, FIG. 2 shows another embodiment of a moulded lattice according to the invention, FIG. 3 shows a further embodiment of a moulded lattice according to the invention, and FIG. 4 shows an attachment system for the filter element shown in FIGS. 1-3.

DESCRIPTION OF EXEMPLARY EMBODIMENTS

Expedient embodiments of the invention will be described below with reference to the drawing. A filter element 1 manufactured according to the method comprises a hollow outer insert 2 in which a hollow inner insert is arranged. In this exemplary embodiment, both the outer insert 2 and the inner insert are tubular with coinciding centre lines.

The outer insert 2 is composed of a base material comprising a filter material 3 made of a resin/material, e.g. cellulose and polyester.

When the outer insert 2 is arranged concentrically relative to the inner insert 3 and they are secured mutually by means of a bottom flange 10 and a top flange 11, a liquid mass 5 is applied by means of a form of nozzle 4 or the like which hardens by cooling or any other impact and is thus capable of providing the stiffening 6 necessary for the filter element 1.

The top and bottom flanges 11, 10 may either be made of a relatively resilient material, which per se may constitute a seal or top and bottom flanges 11, 10 and may be provided with independently interacting sealing means.

In an expedient embodiment, the liquid mass 5 is applied by means of one or more sets of nozzles 4, 7, a set being composed such that one nozzle 4 is moved in a fixed path, and another nozzle 7 is adapted to perform an oscillating movement out of the fixed path (see FIG. 1).

In a particularly simple embodiment, the liquid mass 5 may be applied by means of one or more nozzles 4, which perform a repeated movement extending from the top of the filter element 1 to the bottom of the filter element 1 and back, while the filter element 1 rotates about its own longitudinal axis.

These application examples may be performed in that an applicator with the nozzle 4 performs the mentioned movements, while the filter element 1 is kept still. Another solution model is to allow the filter 1 to rotate, preferably about a horizontal axis, which, however, is not a necessity, while the nozzles 4, 7 are kept still. Moreover, the filter element 1 cannot rotate until liquid mass 5 is supplied from the nozzle 4 or the nozzles 7, followed by supply from the nozzle 4 or the nozzles 7, while the filter element 1 is moved in a combination of a rotating and an oscillating movement.

In a further embodiment (see FIG. 2), a lattice may be moulded in that a larger number of nozzles 4, e.g. ten, are arranged preferably with the same mutual spacing. The nozzles 4 are kept at rest above a filter element 1, which is arranged such that it may rotate about its horizontal axis (when the filter element lies down). When the filter element 1 rotates, ten rings 8 of the liquid material 5 are produced hereby, which material hardens or solidifies subsequently. When the ten rings 8 have been formed, the nozzles 4 are moved in a reciprocal movement extending in the axial direction of the filter element 1, while the filter element 1 rotates about its horizontal axis. This creates a curve 9 which may have the shape of a sine curve, where the upper apex is tangent to the closest ring 8 at one side, and the lower apex is tangent to the closest ring 8 at the other side. The number of rings 8 is here stated to be e.g. ten, but the number is not restricted to this number. The number is adapted to the length of the filter element 1 and to the desired spacing between the individual rings 8.

To prevent waste of material, it may be an advantage that one or more of the outermost positioned nozzles 4 may be sealed off completely or partly during the application of the liquid material 5.

The nozzles 4 may advantageously also be positioned alternately offset relative to the line on which it would be natural to position these, so that every other nozzle 4 is arranged on a line of its own spaced from the intermediate nozzles 4. The effect of this is that when the filter element 1 rotates to have the first lines of liquid material 5 applied, so that these lines essentially constitute rings 8 or circles which extend around the filter element 1, the rings 8 or the circles will be closed when the filter element 1 has performed one rotation. Then, the two rows of nozzles 4 begin to move in an oscillating movement. This oscillating movement may be in the same direction, in the opposite direction or offset with a delay so that the apexes of the curves 9 between the individual rings 8 or circles are offset along the circumference of the filter element. The extent of the oscillating movement may be varied or adapted to the current dimension of the filter element.

Liquid material 5 may be applied to the internal side of the filter element 1 simultaneously with the application of liquid material 5 to the outer side of the filter element 1. This may be done e.g. by moving a long arm inwards along the centre axis of the filter element 1, said arm thus following the movement of the external nozzles 4.

The applied lattice 8, 9 may comprise rings 8 or circles and/or curves 9. A lattice comprising rings 8 may also be applied to the internal surface of the filter element 1 and curves 9 to the external surface of the filter element 1 or vice versa. A combination of these examples of rings 8 and/or curves 9 may be used for achieving the best stiffening for a given dimension of a filter element.

It is also possible to have an embodiment in which the nozzles 4 are kept at rest and the filter element 1 rotates, at the same time as the filter element 1 moves in an oscillating movement in the direction of the centre axis.

In a further embodiment (see FIG. 3), a suitable number of rings 8 or circles are applied, as mentioned in the above embodiment, following which liquid material 5 is applied in a coherent curve 9 extending from one end of the filter element 1 towards the other end of the filter element 1 and back. This course is repeated until the curve 9 meets "itself" or intersects itself again.

In connection with the mounting of the filter element 1, where it is important that the admitted air does not leak past the filter element 1, a gasket/seal (not shown in the drawing) is used, likewise comprising a resin/material, e.g. foaming PU.

The outer insert 2 as well as the inner insert may basically have any configuration, e.g. conical. The conical configuration will mean that one flange, the bottom flange 10, may be omitted, whereby a filter may be manufactured at lower cost. With the greatest cross-section oriented toward the suction side, the conical configuration will thus cause the cross-section to increase through the filter, whereby the air speed diminishes.

FIG. 4 shows an attachment system 12 to which the filter element 1 is attached. The attachment system 12 is made of a metallic or other hard material and comprises an upper attachment part 13 as well as a lower attachment part 14 relative to the upper attachment part 13, the connection between the two attachment parts 13, 14 being provided by a suspension means 17.

In this exemplary embodiment, the upper attachment part 13 comprises a flange comprising defined edges 19 on the side oriented toward the lower attachment part 14, said edges 19 having a mutual distance which corresponds to the external width of the top flange 9 of the filter element, so that the edges 19 engage and support the sides of the top flange 9. A V-shaped suspension part 18 forming part of the suspension means 17 is arranged between the defined edges 19 and oriented in the same direction. The suspension part 18 is attached to the flange 13 by spot welding, and a handle 22 for attachment of the attachment system 12 is mounted opposite the 5 suspension part 18.

The lower attachment part 14 comprises a plate with an opening 20, and two defined edges 19 with the same mutual spacing as the defined edges 19 on the upper attachment part 13 are provided on the side of the plate 14 which is oriented toward the upper attachment part 14. Thus, the edges 19 correspondingly engage and support the sides of the bottom flange 10. A hooked rod 15 is inserted via the opening 20, with the hook part 21 arranged in the suspension part 18. The hooked rod 15 thus constitutes a second part of the suspension means 17.

As indicated by the name, the hooked rod 15 comprises a hook and a rod, said rod comprising threads 16 at its free end, i.e. opposite the hook part 21, and when the hook part is thus placed in the suspension part 18 (indicated by dashed line), the lower attachment part 14 is attached to the upper attachment part 13 by screwing of a wing or fly nut 23.

The configuration of the upper attachment part 13 and the lower attachment part 14, respectively, should be regarded more as being illustrative than being an exact embodiment of the invention, as these attachment parts may very well be configured differently.

Correspondingly, the suspension means 17 may be provided by other solution models, e.g. by screw devices or by a wall which adjoins the inner insert, and which thus constitutes an additional reinforcement.

The invention claimed is:

1. A method of manufacturing a stiffened tubular filter element for use in connection with gas turbines, the method comprising:
    centrally arranging a hollow tubular inner insert inside of a hollow tubular outer insert, securing a top flange at one end of said inserts to form a tubular filter element;
    applying a hardenable liquid in the form of multiple lines to an outer and/or an inner side of the filter element by discharging the liquid from one or more nozzles while moving at least one of the nozzles relative to the filter element to form multiple lines thereon, and further comprising:
    applying the liquid lines so as to form one or more rings which surround the tubular filter element, by fixing one or more nozzles in the longitudinal direction relative to the tubular filter element, while rotating the tubular filter element a number of rotations about a longitudinal axis thereof, and oscillating one or more nozzles with an oscillation greater than or equal to a distance between two rings and smaller than or equal to the length of the filter element, thereby applying and forming connecting lines between the rings, the rings and the connecting lines being in the form of a lattice; and,
    hardening the multiple liquid lines to form a stiffening net which is integral with the tubular filter element, thereby forming the stiffened tubular filter element.

2. A method of manufacturing a stiffened filter element according to claim 1, characterized in that the rings (8) formed from the liquid lines extend helically.

3. A method of manufacturing a stiffened filter element according to claim 1, further comprising using one or more nozzles (4, 7) to apply the liquid lines in rings (8) arranged in planes essentially parallel with end faces (10, 11) of the filter element.

4. A method of manufacturing a stiffened filter element according to claim 1 further comprising using one or more nozzles (4) to first apply the liquid lines in rings (8), while rotating the tubular filter element (1) about a longitudinal axis thereof and then moving the tubular filter element to and fro in a longitudinal direction with an oscillation greater than or equal to a distance between two rings (8) and smaller than or equal to a length of the filter element (1) for applying connecting lines (9) between the rings (8).

5. A method according to claim 1, characterized in that the filter element (1) is made of combustible materials.

6. The method according to claim 1 wherein the stiffening net is formed on the outer side of the tubular filter element.

7. The method according to claim 1 wherein the stiffening net is formed on the inner side of the tubular filter element.

8. The method according to claim 1 wherein a first stiffening net is formed on the outer side of the tubular filter element and a second stiffening net is formed on the inner side of the tubular filter element.

* * * * *